United States Patent [19]

Prella

[11] Patent Number: 4,716,045
[45] Date of Patent: Dec. 29, 1987

[54] PROCESS FOR THE MANUFACTURE OF A DAIRY PRODUCT

[75] Inventor: Giovanni Prella, Vercelli, Italy

[73] Assignee: Nestec S.A., Vevey, Switzerland

[21] Appl. No.: 807,550

[22] Filed: Dec. 11, 1985

[30] Foreign Application Priority Data

Dec. 24, 1984 [EP] European Pat. Off. ........ 84116296.9

[51] Int. Cl.$^4$ ............................................ A23C 19/00
[52] U.S. Cl. ..................................... 426/63; 426/582; 426/401; 426/491
[58] Field of Search ............... 426/8, 61, 36, 38, 40, 426/39, 41, 399, 409, 400, 401, 491, 582, 522, 63

[56] References Cited

U.S. PATENT DOCUMENTS 4,194,011  3/1980  Invernizzi et al. .................. 426/491
4,341,801  7/1982  Weissman .......................... 426/582

Primary Examiner—Raymond N. Jones
Assistant Examiner—Marianne M. Cintins
Attorney, Agent, or Firm—Vogt & O'Donnell

[57] ABSTRACT

A dairy product of the soft-curd fresh cheese type, is disclosed wherein a starting mixture containing casein in the native state, insolubilized whey proteins, fats and optionally a stabilizing hydrocolloid is prepared and sterilized, after which a solution of sterile rennet and then the sterilized starting mixture are introduced into the presterilized packs under highly hygienic conditions, the packs are hermetically closed with presterilized covers and are then left standing under conditions favorable to the action of the rennet.

The end products have an excellent nutritional value and improved keeping properties.

17 Claims, No Drawings

PROCESS FOR THE MANUFACTURE OF A DAIRY PRODUCT

This invention relates to a method for manufacturing a dairy product of the fresh cheese type.

In cheesemaking, cheeses are traditionally divided into several types, according to their appearance and their organoleptic qualities. One of these types are the fresh cheeses so-called because they resemble freshly drained milk curds and have not been cured.

Certain fresh cheeses of the so-called "lactic curd" type are obtained by the action of lactic ferments which, by converting the lactose into lactic acid, increase the acidity of the milk to the isoelectric pH of casein, thus causing the milk to set. This is the case, for example, with Petit Suisse, Cream Cheese or Quarg. Other fresh cheeses, notably Mozzarella, are made by coagulation of milk with rennet, followed by ripening of the curd by lactic fermentation, draining of the curd and stretching of the drained curd. Finally, other fresh cheeses, such as Mascarpone or Ricotta, are made by thermal setting of milk, cream or whey at a predetermined pH. Cheeses of this type are referred to hereinafter as "soft-curd" cheeses to distinguish them from fresh cheeses which have undergone lactic fermentation.

Traditionally, Ricotta is made from ewe's whey, a by-product from the manufacture of Pecorino, by thermal coagulation of the proteins which it contains in a mildly acidic medium. At the present time, a large part of the Ricotta sold is obtained by thermal setting in the presence of acid of a mixture of cow's whey, milk and cream. This product is enjoyed greatly by consumers. In its production, the proteins in the whey are utilized instead of being eliminated in the form of effluents, which is highly advantageous.

Unfortunately, all fresh cheeses, because of their high water content and the absence of rind, are excellent fermentable media which explains why they cannot normally be kept beyond a few days.

For example, Ricotta, if it is made without any particular hygiene precautions, has to be eaten in the week following its production, which limits its marketing. Besides, even if it were distributed under refrigerated conditions (normally around 6°-8° C.), certain infecting agents, such as molds and yeasts growing at that temperature, would render it unsuitable for consumption.

The pasteurization of Ricotta before packing does not bring about any significant improvement in its keeping properties and leaves it with a more compact, unpleasant texture. Sterilization destroys its texture which becomes sandy.

French Patent Application No. 2 405 655 describes a method for making cream cheese, in which whole milk, a concentrate of whey proteins and cream are mixed, and resulting mixture is subjected to ultrafiltration, the retentate is pasteurized and homogenized, lactic ferments are added to the resulting product which is then subjected to fermentation to cause it to set, the coagulum formed is stabilized by addition of sodium chloride and a vegetable gum and the product obtained is packed.

It is possible by this method to make a fermented Cream Cheese which is packed after formation of the coagulum.

The present invention seeks to provide non-fermented fresh cheeses of the soft-curd type which have good keeping properties and organoleptic qualities very similar to milk and which are packed before setting.

The invention relates to a method which is characterized in that a starting mixture containing casein in the native state, fats, whey proteins and, optionally, a stabilizer is prepared, the mixture thus prepared is sterilized and packed under heat and very hygienically in containers while sterile rennet is added thereto, the containers are hermetically sealed and then left standing under conditions favorable to setting of the casein by the rennet.

For the sake of clarity, the preparation of the starting mixture, the sterilizing heat treatment, the highly hygienic packing and the setting of the casein will be dealt with successively in the form of separate sections. The qualifying adjective "highly hygienic" denotes conditions approaching asepsis.

PREPARATION OF THE STARTING MIXTURE

The starting mixture is obtained by successive introduction in suitable proportions of various constituents of milk, such as casein in the native state, fat and whey proteins (particularly lactalbumin), lactose and mineral salts.

The mixture contains casein "in the native state". This means that most of the casein which it contains is not denaturated and thus reacts to rennet.

This casein in the native state may be introduced in the form of retentate obtained by ultrafiltration of more or less skimmed milk. A fresh milk, a milk reconstituted from a powder by addition of water or a milk recombined by addition of water and anhydrous lactic fats to a powder may be subjected to ultrafiltration. The retentate may be a retentate as such or reconsitituted from a powder by addition of water. Where powders are used, they will have been dried under conditions designed to preserve the native state of the casein. The retentate is preferably obtained by concentration of skimmed milk at a pH close to the natural pH of milk, for example 6.7, so as to adjust the ratio by weight of lactose to proteins to 0.25-0.45. The concentration is preferably of the order of 5-fold to approximately 12-15% by weight of total proteins.

The whey proteins are preferably insolubilized by thermal denaturing and may have been isolated from whey by thermal flocculation under conditions of controlled acidity. They are preferably in the form of Ricotta and are obtained, for example, by heating a mixture of whey, milk and/or cream for 15 to 30 minutes to approximately 90° C., drawing off the deproteinized whey, collecting the flocculated proteins by filtration and then pressing them in cloths. The Ricotta obtained in this way has a pH of approximately 6.1-6.2.

Alternatively, the Ricotta may be obtained as described above from milk and whey optionally concentrated by ultrafiltration.

The fat may be of vegetable or animal, preferably lactic, origin. Part of the fat may originate from the milk retentate and/or may be introduced with the whey proteins insolubilized as described above. The remainder is preferably in the form of cream, for, example containing 50% by weight of fats, having a pH of approximately 6.6-6.7.

The starting mixture advantageously consists of 65-85% by weight of ultrafiltered skimmed milk, 3 to 15% by weight of Ricotta and 4 to 30% by weight of cream.

The above starting materials, preferably preheated, may be mixed in a vat and then introduced into a colloid mill and/or a homogenizer operating under controlled conditions, for example, at a pressure below $4.9 \times 10^6$ Pa. The object of this operation is to microdisperse the Ricotta in the liquid medium so that it is unnoticeable in the final mixture. If the Ricotta is not dispersed sufficiently homogeneously, there is a risk of solid particles separating during the subsequent sterilizing treatment with appearance of a burnt taste. On the other hand, over-homogenization would result in an excessively soft texture of the end product. The mixture intended for homogenization should preferably be low in foam so as not to incorporate too much air, which would also have an adverse effect on the texture (too soft).

Stabilizers of the protective hydrocolloid type are preferably added to the mixture to make the end product more stable by reducing the quantity of serum which could separate during marketing of the product. Thus, alginate or carraghenate may be added, for example, in a quantity of from 0.1 to 0.3% by weight, based on the mixture.

THERMAL STERILIZING TREATMENT

The object of this treatment is to destroy the microbial flora, including the sporulated forms, present in the starting product. It may be carried out by any sterilization technique, by indirect heating (scraped-surface or plate-type heat exchanger) or direct heating (injection of steam), for example, by UHT (ultra-high temperature) sterilization. The nature and duration of the treatment will be selected according to the desired texture of the end product.

Steps are preferably taken to ensure that the pH does not fall below 6.6 to avoid even partial setting of the proteins in the mixture, particularly the casein, and to maintain its reactivity to rennet in order to obtain the desired texture. A sterilizing treatment for 8 to 60 s at 130°–145° C. is suitable.

HIGHLY HYGIENIC PACKING AND ADDITION OF SETTING AGENT

The sterilized intermediate product should be packed in such a way that no microorganism from the surrounding environment is able permanently to implant itself therein. These conditions may be fulfilled by packing under heat, for example, at a temperature of from 45° to 55° C., in thermoformed packs under perfect hygienic conditions. For example, the packs are thermoformed from a thermoformable polymer film impermeable to light, moisture and oxygen, for example, of polyvinylchloride or polystyrene immersed beforehand in a bath of hydrogen peroxide and dried in hot air. Similarly, the packs are hermetically sealed after filling, for example, by means of covers formed from aluminium foils coated with heat-sealable lacquer which are sterilized as described above and then heat-sealed. The actual packing operation is preferably carried out in an enclosure under a slight excess pressure of sterile air in relation to atmospheric pressure.

Sterile rennet is introduced into the packs during or preferably before introduction of the product from a sterile reservoir of which the temperature is preferably ambient temperature. The enzyme may be of animal or, preferably, microbial origin and may be in the form of a suitable solution capable of being sterilized by microfiltration, for example, by passage through a filter retaining particles larger than 0.22 micron in size, and diluted to the desired strength, for example, to 1/200th. The quantity added preferably amounts to between 1 and 3% by weight, based on the mixture.

SETTING

Setting comprises keeping the packed product under conditions which provide for optimum action of the rennet. It may be carried out by transferring the packs to a room at a temperature of 30°–40° C. and keeping them at that temperature for 1 to 3 hours. This transfer is preferably carried out no longer than 15 minutes after filling so as to avoid setting of the product in motion which would have an adverse effect upon the texture of the end product.

The products obtained may be improved, preferably after the sterilizing treatment during packing and under sterile conditions, preferably after addition of the rennet and the sterilized intermediate product, by adding additives and/or ingredients, for example, food coloring and flavorings, spices, for example, herbs, pieces of fruit, sugar, preserves or honey. These additives must of course be able to be sterilized. They should be present in such a quantity that they do not inhibit the action of the rennet or preferably, their specific gravity should be such that they form a separate layer, as, for example, in the case of honey which sinks to the bottom of the packs.

With their pure white color, their delicate milky flavor and the similarity of their characteristics to Ricotta, the cheese-type products obtained by the method according to the invention may be consumed as such as a dessert or snack or may be used as ingredients of desserts or sauces. As long as they remain in their unopened pack, they will keep for 3 to 4 weeks at 10° to 15° C. or for 6 to 8 weeks at 4° to 6° C., which is remarkable for fresh products. They have an excellent nutritional value in their high content of readily digestible proteins and assimilable calcium.

They are particularly suited to the needs of infants and growing adolescents and to the needs of old people and hospital patients.

The method according to the invention is illustrated by the following Examples in which the parts and percentages quoted are by the weight, unless otherwise indicated.

EXAMPLE 1

1. Whole milk is pasteurized for 15–20 seconds at 72° C. and skimmed to give a cream containing 50% fats. The skimmed milk is introduced into an ultrafiltration module and is concentrated approximately four times at a temperature of 50° C. until the retentate contains 13.5% proteins. The retentate is then pasteurized for 1 minute at 65° C., cooled and then stored in a vat at 4° C. It has a pH of 6.65–6.70.

2. The cream containing 50% fats is pasteurized, cooled and then stored in a vat at 4° C. It has a pH of 6.7.

3. Ricotta is conventionally prepared and then treated to obtain a product containing 30% dry matter and 60% fats/dry matter for a pH of 6.2. The product is cooled and stored at 4° C.

15 parts of Ricotta (3) are dispersed in 15 parts of retentate (1) by mixing in a kneader with agitation and then by passage through a colloid mill. The rest of the retentate (1), i.e., 66 parts, and 4 parts of cream (2) are added to the dispersion, after which the mixture is preheated to 50° C. and homogenized at $2.45 \times 10^6$ Pa.

The homogenized mixture is then delivered to a line consisting of two scraped-surface heat exchangers in series connected to a double-jacketed buffer tank which is itself connected to a group of aseptic metering units situated in the enclosure of the filling machine. All these various elements are carefully sterilized with steam at 120° C. for 20 minutes. A first scraped-surface heat exchanger heats the mixture from 50° C. to 135° C. whilst a second cools it from 135° C. to 50° C. with a dwell time between the two of 8 seconds. After sterilization, the mixture is stored in the sterile buffer tank kept at 50° C.

Powdered microbial rennet is dissolved in a quantity of demineralized water sufficient to adjust its strength to 1/200. It is prefiltered and then sterilely filtered by passage through a sterilizing filter (maximum pore diameter: 0.22 micron). The sterile solution is then delivered to a group of aseptic metering units of the filling machine by means of sterile air. The elements situated below the sterilizing filter will of course have been sterilized beforehand.

Using a highly hygienic packaging machine successively comprising:
- a thermoforming station making 125 ml pots from a sheet of PVC (polyvinylchloride) immersed beforehand in a solution of hydrogen peroxide and dried in hot air,
- a group of aseptic metering units for the sterile rennet solution,
- a group of aseptic metering units for the sterilized mixture,
- a heat-sealing station for heat sealing a lacquered aluminium foil immersed beforehand in a solution of hydrogen peroxide and dried in hot air, and
- a cutting station for cutting off the pots of packed product, the enclosure of the machine being under a slight excess pressure of sterile air in relation to atmospheric pressure, 2 ml of the sterile rennet solution is introduced into the pots which are then filled with sterilized mixture (the liquids are transferred by means of sterile compressed air) and the covers are heat-sealed.

The pots are transferred to a room where they remain for 2 h at 35° C. On completion of the setting phase, the pots are cooled to 4° C. They are then ready for marketing.

The end product has the following composition:

|  | % |
|---|---|
| Moisture | 78.5 ± 0.5 |
| Total dry matter | 21.5 ± 0.5 |
| including fats | 4.50 ± 0.25 |
| total proteins | 11.75 ± 0.25 |
| lactose | 3.9 ± 0.1 |
| ash | 1.35 ± 0.05 |

EXAMPLE 2

The procedure is as in Example 1, except that the starting mixture is prepared by dispersing 2 parts of Ricotta (3) in 2 parts of retentate (1) and mixing the dispersion obtained with 67 parts of retentate (1) and 29 parts of cream (2).

The end product has the following composition:

|  | % |
|---|---|
| Moisture | 69 ± 1 |
| Total dry matter | 31 ± 1 |
| including fats | 16 ± 0.5 |
| total proteins | 10 ± 0.25 |
| lactose | 3.7 ± 0.1 |
| ash | 1.3 ± 0.1 |

EXAMPLE 3

The procedure is as in Example 1, except that the dispersed mixture is sterilized with steam for 25 seconds at 30° to 140° C. in a UHT installation.

After setting, the end product has a more unctuous texture (less firm, but smoother) then that obtained in accordance with Example 1.

EXAMPLE 4

The procedure is as in Example 3 using the starting mixture of Example 2.

After setting, the end product has a more unctuous texture (less firm, but smoother) than that obtained in accordance with Example 2.

EXAMPLE 5

The procedure is as in Examples 1 to 4, except that a protective hydrocolloid in the form of 0.2%, based on the weight of the mixture, of sodium alginate or carraghenate is added to the starting mixture.

After setting, the end products have a firmer texture and show slight exudation of serum during marketing.

What is claimed is:

1. A method for manufacturing a non-fermented dairy product of the soft-curd fresh cheese type comprising preparing a starting mixture by homogeneously mixing casein in the native state, fats and whey proteins, sterilizing the starting mixture at a pH and at a temperature and for a time which maintains the casein in the native state and reactive to rennet, introducing the sterilized starting mixture and sterile rennet into a sterile container under hygienic conditions and hermetically sealing the sterilized mixture and sterile rennet product within the container and then subjecting the hermetically sealed product to temperature and time conditions sufficient for the sterile rennet to set the product.

2. A method as claimed in claim 1 wherein the casein in the native state is in the form of a milk retentate and the whey proteins are in the form of Ricotta.

3. A method as claimed in claim 2 wherein the milk retentate is in the form of an ultrafiltration retentate of skimmed milk and the starting mixture contains from 65 to 85% by weight of the ultrafiltration retentate, from 3 to 15% by weight of Ricotta and from 4 and 30% by weight of cream.

4. A method as claimed in claim 3 further comprising, prior to homogenizing the starting mixture, first dispersing and mixing the Ricotta with a substantially equal quantity by weight of the ultrafiltration retentate and then introducing additional ultrafiltration retentate and the cream into the mixed Ricotta and ultrafiltration retentate to form the starting mixture, such that the starting mixture contains from 65 to 85% by weight of the ultrafiltration retentate, and then homogenizing the starting mixture at a pressure below approximately $4.9 \times 10^6$ Pa.

5. A method as claimed in claim 1 wherein the starting mixture is sterilized for 8 to 60 seconds at 130° to 145° C. at a pH of at least 6.6.

6. A method as claimed in claim 1 wherein the sterilized starting mixture is introduced into and sealed in the container in an enclosed environment having a positive pressure of sterile air in relation to atmospheric pressure and at a temperature of 45° to 55° C.

7. A method as claimed in claim 1 wherein the sealed product is left standing for 1 to 3 hours at 30° to 40° C.

8. A method as claimed in claim 1 further comprising introducing additional sterile ingredients selected from the group consisting of colorings, flavorings, spices, herbs, pieces of fruit, sugar, preserves and honey and combinations thereof under hygienic conditions with the sterilized starting mixture and the sterile rennet in an amount which does not inhibit the action of the rennet.

9. A method as claimed in claim 1 further comprising introducing a stabilizer in a quantity of from 0.1 to 0.3% by weight with the starting mixture.

10. A method as claimed in claim 1 wherein the casein in the native state is a retentate.

11. A method as claimed in claim 3 wherein the retentate contains from 12 to 15% dry matter, the Ricotta contains about 30% dry matter and the cream contains about 50% fats.

12. A method for manufacturing a non-fermented dairy product of the soft-curd fresh cheese type comprising preparing a starting mixture by homogeneously mixing a milk retentate, fats and Ricotta, sterilizing the starting mixture at a pH and at a temperature and for a time which avoids setting of proteins and maintains the proteins reactive to rennet, introducing the sterilized starting mixture and sterile rennet into a sterile container under hygienic conditions and hermetically sealing the sterilized mixture and sterile rennet product within the container and then subjecting the hermetically sealed product to temperature and time conditions sufficient for the sterile rennet to set the product.

13. A method as claimed in claim 12 wherein the retentate is in the form of an ultrafiltration retentate of skimmed milk and the starting mixture contains from 65 to 85% by weight of the ultrafiltration retentate, from 3 to 15% by weight of Ricotta and from 4 to 30% by weight of cream.

14. A method as claimed in claim 13 further comprising, prior to homogenizing the starting mixture, first dispersing and mixing the Ricotta with a substantially equal quantity by weight of the ultrafiltration retentate and then introducing additional ultrafiltration retentate and the cream into the mixed Ricotta and ultrafiltration retentate to form the starting mixture, such that the starting mixture contains from 65 to 85% by weight of ultrafiltration retentate, and then homogenizing the starting mixture at a pressure below approximately $4.9 \times 10^6$ Pa.

15. A method as claimed in claim 12 or 13 or 14 wherein the starting mixture is sterilized for 8 to 60 seconds at 130° to 145° C. at a pH of at least 6.6.

16. A method as claimed in claim 15 wherein the sterilized starting mixture is introduced into and sealed in the container in an enclosed environment having a positive pressure of sterile air in relation to atmospheric pressure and at a temperature of 45° to 55° C. and wherein the sealed product is left standing for 1 to 3 hours at 30° to 40° C.

17. The product of the method claimed in claim 1 or 2 or 3 or 8 or 9 or 12 or 13.

* * * * *

UNITED STATES PATENT AND TRADEMARK OFFICE
CERTIFICATE OF CORRECTION

PATENT NO. : 4,716,045
DATED : December 29, 1987
INVENTOR(S) : Giovanni Prella

It is certified that error appears in the above-identified patent and that said Letters Patent is hereby corrected as shown below:

At column 1, line 57, "and" should be -- the --.

At column 2, line 62, after "for" delete the comma; after "example" insert a comma.

At column 6, line 56, that is, in line 5 of Claim 3, the second occurrence of "and" should be -- to --.

Signed and Sealed this

Twenty-first Day of June, 1988

Attest:

Attesting Officer

DONALD J. QUIGG

Commissioner of Patents and Trademarks